United States Patent
Kazama et al.

(10) Patent No.: US 9,152,472 B2
(45) Date of Patent: Oct. 6, 2015

(54) LOAD DISTRIBUTION SYSTEM

(75) Inventors: Satoshi Kazama, Kawasaki (JP);
Yoshiyasu Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 839 days.

(21) Appl. No.: 13/041,697

(22) Filed: Mar. 7, 2011

(65) Prior Publication Data

US 2011/0231860 A1    Sep. 22, 2011

(30) Foreign Application Priority Data

Mar. 17, 2010   (JP) .................................. 2010-060389

(51) Int. Cl.
*G06F 9/46* (2006.01)
*G06F 9/50* (2006.01)

(52) U.S. Cl.
CPC ............ *G06F 9/5094* (2013.01); *Y02B 60/142* (2013.01)

(58) Field of Classification Search
CPC ........................... G06F 9/5094; Y02B 60/142
USPC .......... 718/100, 102, 104, 105; 713/320, 340
See application file for complete search history.

(56) References Cited

U.S. PATENT DOCUMENTS

| | | | | |
|---|---|---|---|---|
| 6,986,066 | B2 * | 1/2006 | Morrow et al. ............... | 713/320 |
| 7,421,623 | B2 * | 9/2008 | Haugh ......................... | 714/47.2 |
| 7,793,291 | B2 * | 9/2010 | Arai et al. ..................... | 718/100 |
| 8,018,614 | B2 * | 9/2011 | Bansal et al. ................. | 358/1.15 |
| 8,245,059 | B2 * | 8/2012 | Jackson ........................ | 713/300 |
| 2005/0081208 | A1 * | 4/2005 | Gargya et al. ................ | 718/100 |
| 2005/0278520 | A1 * | 12/2005 | Hirai et al. ................... | 713/1 |
| 2007/0198721 | A1 | 8/2007 | Ikawa et al. | |
| 2009/0100437 | A1 * | 4/2009 | Coskun et al. ............... | 718/105 |
| 2009/0327778 | A1 * | 12/2009 | Shiga et al. .................. | 713/320 |
| 2010/0325465 | A1 * | 12/2010 | Kazama et al. .............. | 713/340 |
| 2011/0010717 | A1 * | 1/2011 | Yamaoka et al. ............ | 718/102 |
| 2011/0016472 | A1 * | 1/2011 | Kobayashi .................... | 718/104 |
| 2011/0138395 | A1 * | 6/2011 | Wolfe ........................... | 718/105 |
| 2011/0161978 | A1 * | 6/2011 | Jang et al. .................... | 718/104 |
| 2013/0073875 | A1 * | 3/2013 | Anderson et al. ............ | 713/300 |

FOREIGN PATENT DOCUMENTS

| | | |
|---|---|---|
| JP | 04-215168 A | 8/1992 |
| JP | 2004126968 A | 4/2004 |
| JP | 2004-530181 A | 9/2004 |
| JP | 2006277637 A | 10/2006 |

(Continued)

OTHER PUBLICATIONS

Japanese Decision of Rejection issued Mar. 25, 2014 in Patent Application No. 2010-060389 (with partial English translation).

(Continued)

*Primary Examiner* — Emerson Puente
*Assistant Examiner* — Willy W Huaracha
(74) *Attorney, Agent, or Firm* — Oblon, McClelland, Maier & Neustadt, L.L.P.

(57) ABSTRACT

A load distribution system for allocating a job to one of a plurality of arithmetic devices includes a temperature data acquirer, a candidate selector, and a job allocator. The temperature data acquirer acquires temperature data indicating temperature of each of the plurality of arithmetic devices. The candidate selector selects at least one of the plurality of arithmetic devices as a candidate for a device to which the job is to be allocated. The job allocator allocates the job to the selected candidate.

13 Claims, 13 Drawing Sheets

(56) References Cited

FOREIGN PATENT DOCUMENTS

| JP | 2007-172322 | 7/2007 |
| JP | 2007-219964 | 8/2007 |
| JP | 2010039802 A | 2/2010 |
| WO | WO-02/054198 | 7/2002 |

OTHER PUBLICATIONS

Notification of Refusal issued Dec. 17, 2013 in Japanese Patent Application No. 2010-060389 with English translation, 6 pages.

* cited by examiner

| TEMPERATURE [°C] | POWER CONSUMPTION OF 1st SERVER [Wh] | POWER CONSUMPTION OF 2nd SERVER [Wh] | POWER CONSUMPTION OF 3rd SERVER [Wh] | POWER CONSUMPTION OF 4th SERVER [Wh] |
|---|---|---|---|---|
| 60 | $55 \times 10^{-8}$ | $45 \times 10^{-8}$ | $50 \times 10^{-8}$ | $60 \times 10^{-8}$ |
| 61 | $55 \times 10^{-8}$ | $46 \times 10^{-8}$ | $50 \times 10^{-8}$ | $61 \times 10^{-8}$ |
| 62 | $56 \times 10^{-8}$ | $46 \times 10^{-8}$ | $51 \times 10^{-8}$ | $63 \times 10^{-8}$ |
| 63 | $56 \times 10^{-8}$ | $47 \times 10^{-8}$ | $51 \times 10^{-8}$ | $64 \times 10^{-8}$ |
| 64 | $57 \times 10^{-8}$ | $47 \times 10^{-8}$ | $51 \times 10^{-8}$ | $66 \times 10^{-8}$ |

FIG. 6

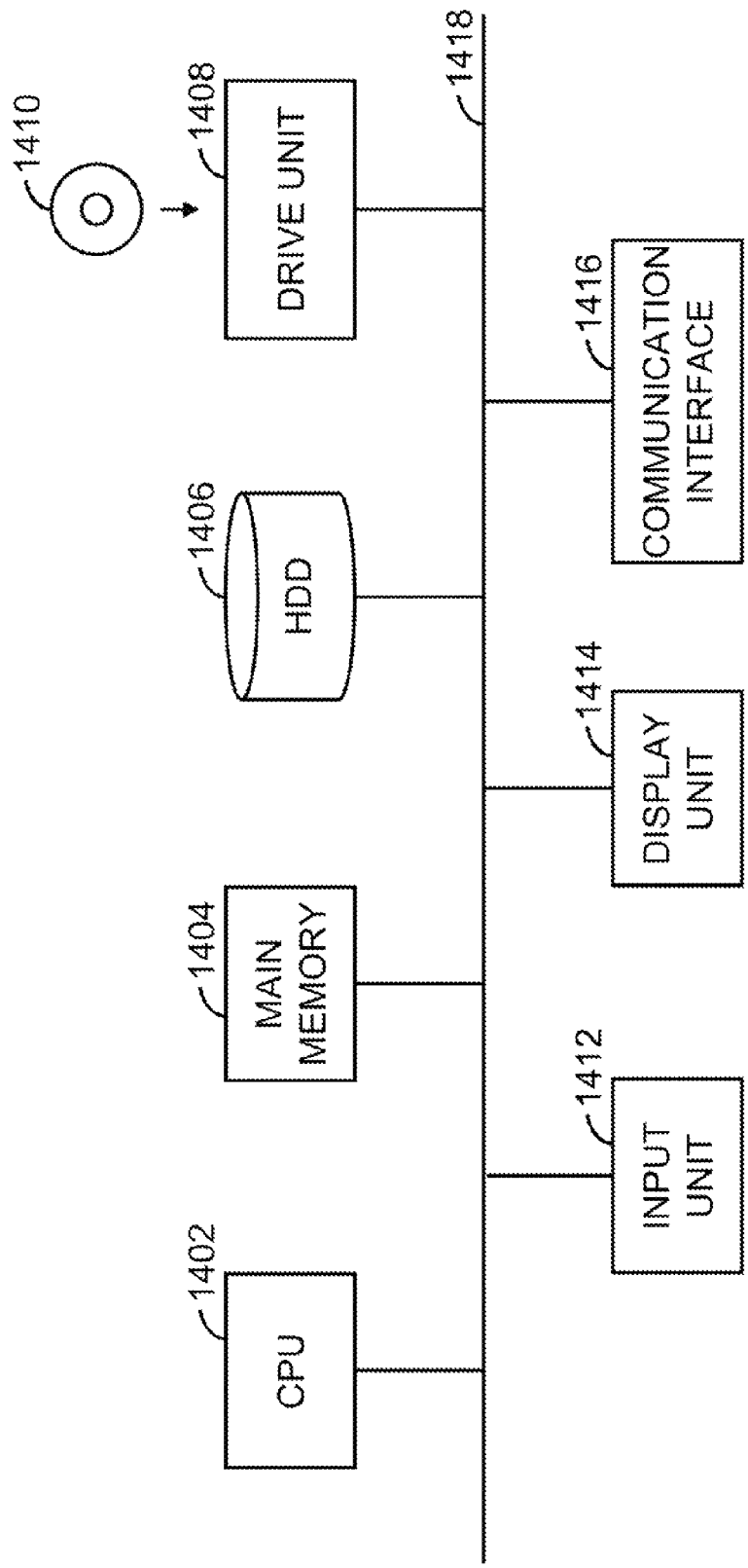

LOAD DISTRIBUTION SYSTEM

CROSS-REFERENCE TO RELATED APPLICATION

This application is based upon and claims the benefit of priority of the prior Japanese Patent Application No. 2010-060389, filed on Mar. 17, 2010, the entire contents of which are incorporated herein by reference.

FIELD

The embodiments discussed herein are related to a load distribution.

BACKGROUND

In a client-server system including a plurality of servers, a request which is given from a client to a server which is an arithmetic device for processing a job is allocated to one of the plurality of servers by a load balancer that functions as load distribution means. That is, a job which has been designated by a user of the client is allocated to one of the servers. Job allocation is performed in accordance with a previously set load distribution algorithm. The load distribution algorithms includes a round robin algorithm in which a server to which a job is to be allocated is selected in order, an algorithm in which a server which has the smallest number of in-process connections is selected, and an algorithm in which a server which responds first is selected.

In various systems including the client-server system, a reduction of power consumption is now being promoted. In order to attain power saving, for example, such a technique is proposed that only when load is lower than a threshold value in a computer system including a plurality of central processing units (CPUs), a CPU which is low in throughput but is low in power consumption is selected to be used. In addition, such a technique is also proposed that a task is scheduled to two processors of different power efficiencies so as to minimize the power consumption.

SUMMARY

According to an aspect of the present invention, provided is a load distribution system for allocating a job to one of a plurality of arithmetic devices. The load distribution system includes a temperature data acquirer, a candidate selector, and a job allocator. The temperature data acquirer acquires temperature data indicating temperature of each of the plurality of arithmetic devices. The candidate selector selects at least one of the plurality of arithmetic devices as a candidate for a device to which the job is to be allocated. The job allocator allocates the job to the selected candidate.

The object and advantages of the invention will be realized and attained by means of the elements and combinations particularly pointed out in the claims. It is to be understood that both the foregoing general discussion and the following detailed discussion are exemplary and explanatory and are not restrictive of the invention, as claimed.

BRIEF DESCRIPTION OF DRAWINGS

FIG. 6 is a diagram illustrating an exemplary data structure of a property table according to an embodiment of the present invention;

FIG. 14 is a diagram illustrating an exemplary configuration of a computer.

DESCRIPTION OF EMBODIMENTS

Power consumption of an arithmetic device processing a job allocated to the arithmetic device changes depending on the temperature of the arithmetic device at that point of time. In general, the power consumption increases as the temperature increases from normal temperature. However, in existing systems, jobs are allocated to arithmetic devices without taking the temperature of the arithmetic device into consideration. Thus, it may sometimes occur that a job is allocated to one arithmetic device in a high power consuming state regardless of presence of another arithmetic device in a low power consuming state and hence surplus power is consumed accordingly. In addition, it may also sometimes occur that a job is allocated to an arithmetic device the temperature of which may excessively increase in execution of the job allocated thereto.

In a load distribution system, it may be preferable to realize load distribution reflecting the temperature-dependent operation property of each of the plurality of arithmetic devices included in the system.

According to the embodiments, such load distribution may be realized that reflects the temperature-dependent operation property of each of the plurality of arithmetic devices included in the load distribution system.

Figure 1:
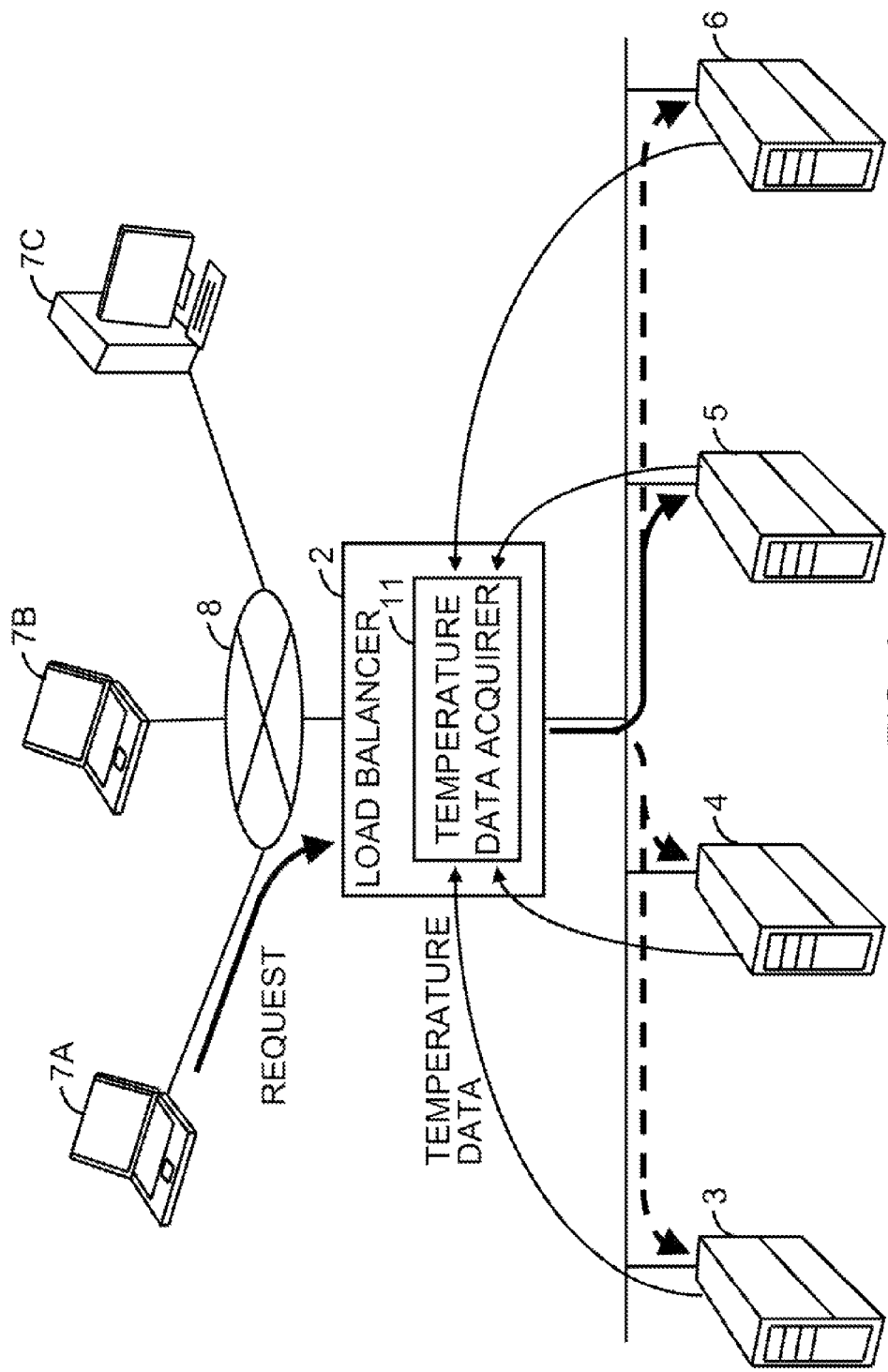
FIG. 1 is a diagram illustrating an exemplary configuration of a client-server system according to an embodiment of the present invention.

FIG. 1 illustrates an exemplary configuration of a client-server system that executes load distribution according to the embodiments. In the example illustrated in FIG. 1, a load balancer 2 allocates a job to one of four servers, that is, a first server 3, a second server 4, a third server 5 and a fourth server 6. The number of servers is not limited to four and two or more servers may be included. A request for a job made from each of clients 7A, 7B and 7C to the servers 3, 4, 5 and 6 is sent to the load balancer 2 over a communication network 8 such as the Internet, a local area network (LAN) or the like. Then, the load balancer 2 allocates the job to one of the servers in response to reception of the request from the client concerned. In the job allocation, a temperature data acquirer 11 acquires temperature data indicating temperatures which may influence execution of the job from the respective servers 3, 4, 5 and 6. Then, the job is allocated to one of the servers 3, 4, 5 and 6 in accordance with the acquired temperature data.

The functions of the load balancer 2 including the temperature data acquirer 11 may be implemented by an information processing device (a computer) by executing software. FIG. 14 illustrates an exemplary configuration of the computer. As illustrated in FIG. 14, the computer that functions as the load balancer 2 may include a CPU 1402 for executing the software such as operating system (OS) and application programs, a main memory 1404 for temporarily storing data, an auxiliary storage such as a hard disk drive (HDD) 1406 for storing data, a drive unit 1408 for reading data from and/or writing data to a removable disk 1410, an input unit 1412 for accepting user input, a display unit 1414 for displaying data, and a communication interface 1416 for establishing a connection to a network. These components are connected to each other via a bus 1418. The software may be stored in the removable disk 1410 when delivered, installed onto the HDD 1406 from the removable disk 1410, and loaded into the main memory 1404 from the HDD 1406 when executed by the CPU 1402. The software may be delivered over the network.

In the following, embodiments 1, 2 and 3 which are configured to be favorably adaptable to a load distribution system which is supposed to be applied to a client-server system as illustrated in FIG. 1 will be discussed. In the drawings referred to in the discussion of the embodiments 1, 2 and 3, two of four servers illustrated in FIG. 1 will be illustrated as representatives.

[First Embodiment]

Figure 2:
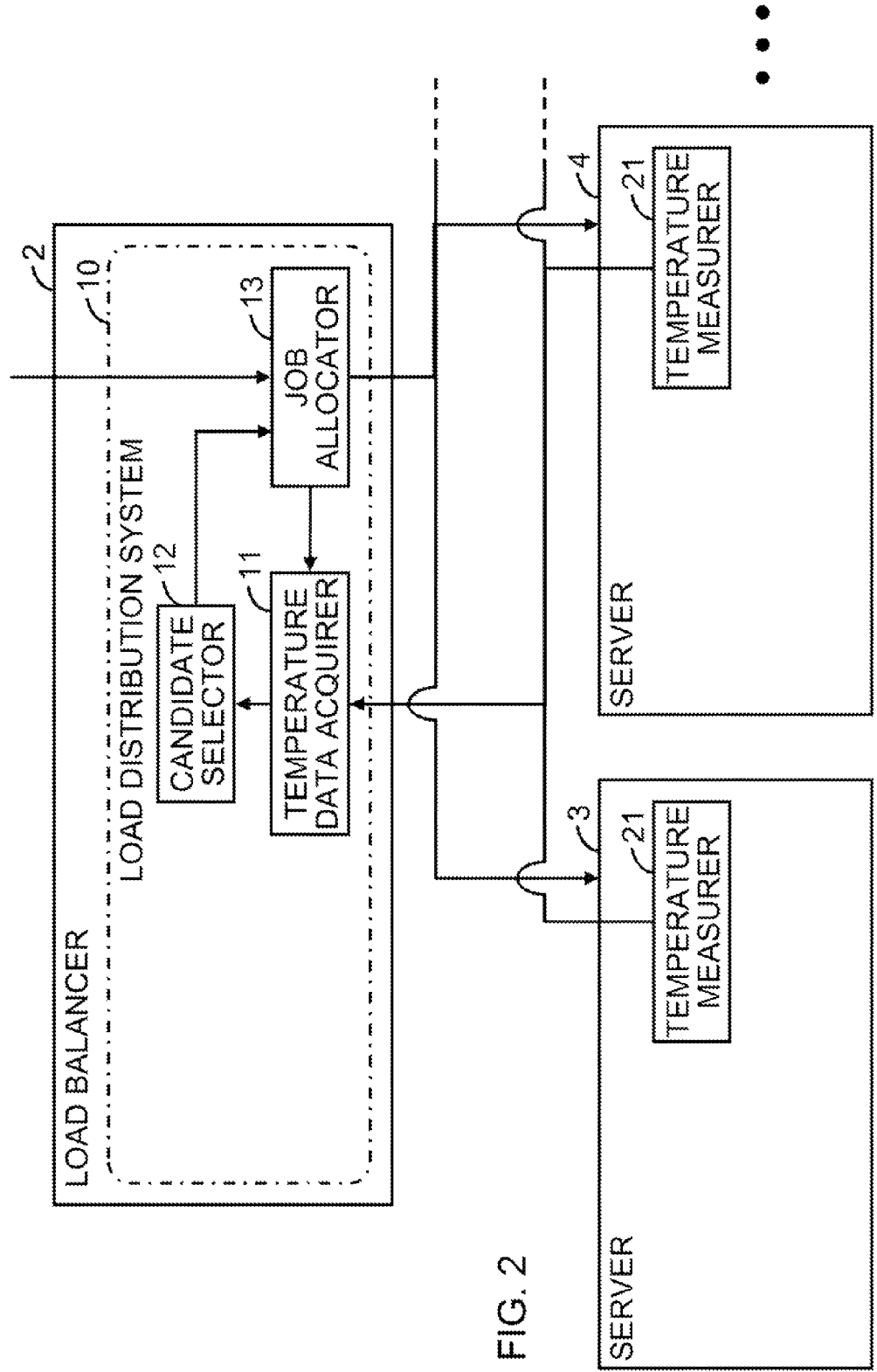
FIG. 2 is a diagram illustrating an exemplary configuration of a load balance system according to an embodiment of the present invention.

FIG. 2 illustrates an exemplary configuration of a load balance system according to a first embodiment. As illustrated in FIG. 2, a load distribution system 10 is provided in the load balancer 2 according to the present embodiment by installing software. The load distribution system 10 functionally includes a temperature data acquirer 11, a candidate selector 12 and a job allocator 13. The functions of the functional elements of the load distribution system 10 are as follows.

The temperature data acquirer 11 receives from the job allocator 13 a notification of receiving a job and inquires of a temperature measurer 21 included in each of the plurality of servers 3 and 4 about temperature thereof. In the above mentioned situation, servers to which inquiries are actually made include not only the above mentioned two servers 3 and 4 illustrated in FIG. 2 but all the servers other than servers exempted for reason of maintenance and other reasons. Upon receiving responses from the plurality of servers 3 and 4 and acquiring temperature data of each of the servers 3 and 4, the temperature data acquirer 11 hands over the acquired temperature data to the candidate selector 12 together with identification information of each server from which the temperature data has been acquired.

Figure 3:
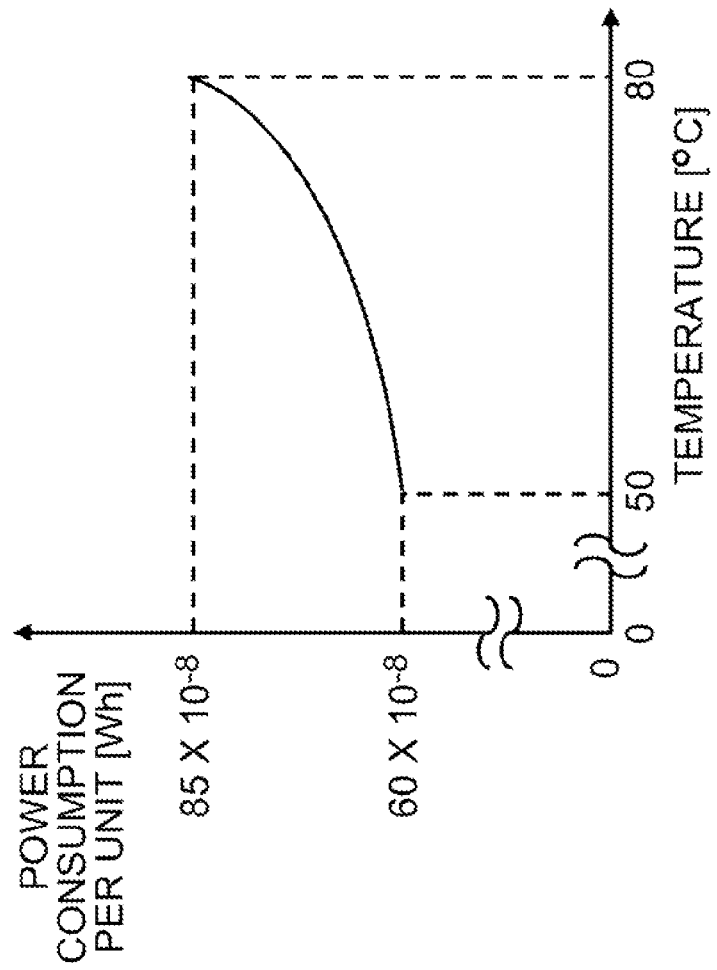
FIG. 3 is a diagram illustrating an exemplary temperature-dependent property of power consumption.

The temperature that the temperature data acquirer inquires of each temperature measurer 21 is a temperature relating to reduction of power consumption in execution of a job. In the case that the server 3 or 4 executes a job allocated thereto, a CPU which is included in each of the servers 3 and 4 as a substantial arithmetic device consumes the power. The power consumption of the CPU changes depending on the temperature of the CPU. FIG. 3 illustrates an exemplary temperature-dependent property of power consumption. Specifically, as illustrated in FIG. 3, the power consumption [Wh] per unit such as a command or unit time increases with increase of the temperature within a normal operating temperature range. Thus, the temperature measurer 21 in each of the servers 3 and 4 measures the present temperature of the CPU included in each of the servers 3 and 4 and notifies the temperature data acquirer 11 of temperature data of the measured temperature as a response to the inquiry from the temperature data acquirer 11 of the load balancer 2.

The functions of the temperature measurer 21 of each of the servers 3 and 4 may be implemented by the CPU thereof, for example, by executing software. In general, a CPU assembled into a presently available computer may have a temperature sensor built-in and the computer including the CPU of the above mentioned type usually controls the temperature in accordance with an OS. Therefore, the servers 3 and 4 equipped with the temperature measurers 21 may be realized by installing a program for acquiring the latest data of the measured temperature from the OS function into an existing computer without changing a hardware configuration.

The candidate selector 12 selects at least one of the plurality of servers 3 and 4 as a candidate for a device to which the job is to be allocated in accordance with the temperature data acquired by the temperature data acquirer 11. From the viewpoint of power saving, it may be favorable to allocate the job to a server achieving lower power consumption. Here, it is supposed that the temperature-dependent properties of power consumption of all the servers are substantially the same as one another. For example, if all the servers are of the same type, in many cases, the properties thereof will be almost the same as one another. As illustrated in FIG. 3, the power consumption exhibits such a temperature-dependent property that it monotonously increases with increase of the temperature. Thus, it may be said that the lower the present temperature is, the lower the power consumption is. Therefore, the candidate selector 12 selects, as the candidates, servers corresponding to one or more pieces of temperature data selected from among pieces of temperature data of the servers 3 and 4 acquired by the temperature data acquirer 11 in order in which the data having a lower value is selected earlier than others. The number of candidates is smaller than the total number of servers included in the system and is set in accordance with an algorithm applied to the job allocator 13.

In the case that the number of candidates is set to "1", the candidate selector 12 selects the server having the lowest present temperature as the candidate. In the case that the number of candidates is set to "1", the job is unconditionally allocated to the candidate that the candidate selector 12 has selected. In the above mentioned case, the candidate selector 12 functions as means for substantially determining the server to which the job is allocated.

The job allocator 13 allocates the job to the candidate that the candidate selector 12 has selected. Upon receiving a request from a client, the job allocator 13 notifies the temperature data acquirer 11 of reception of the request and waits until the candidate is selected by the candidate selector 12. In the case that the number of candidates notified from the candidate selector 12 is "1", the job allocator 13 allocates the job to the candidate. In the case that the candidate selector 12 notifies the job allocator 13 of a plurality of candidates, the job allocator 13 allocates the job to one of the plurality of candidates in accordance with a previously determined algorithm. For example, such an algorithm may be applicable that jobs are not continuously allocated to the same server so as to uniformly distribute the load. In addition, such an algorithm may be also applicable that in the case that the load on the first candidate exceeds a fixed value, the job is allocated to the second candidate.

Figure 4:
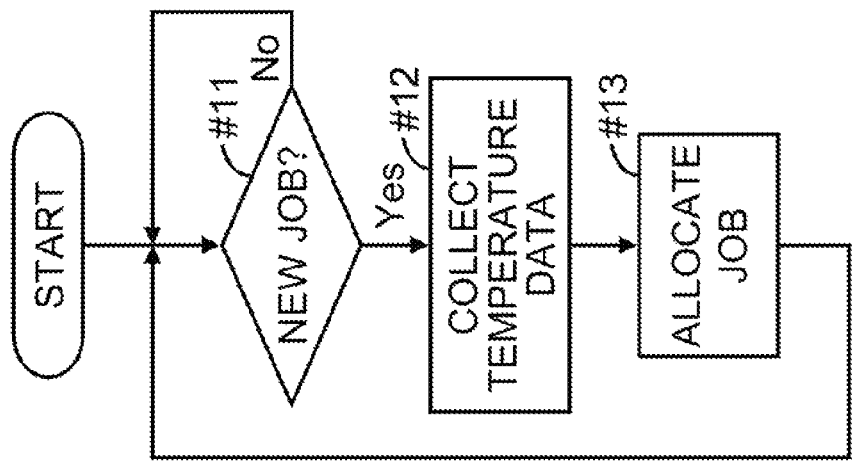
FIG. 4 is a diagram illustrating an exemplary operation flow of a load distribution system according to an the embodiment of the present invention.

FIG. 4 illustrates an exemplary operation flow of the load distribution system 10 according to the present embodiment. The load distribution system 10 waits until a new job arrives at the load balancer 2 (operation #11). Upon the arrival of the new job, the load distribution system 10 collects pieces of temperature data of the plurality of servers to determine servers having lower temperature (operation #12). The load distribution system 10 allocates the job to, for example, the server having the lowest temperature among the servers in accordance with a result of the determination (operation #13). Then, the load distribution system 10 waits for arrival of the next job. Before or after the job allocation executed in operation #13, the load distribution system 10 may store a log including information used for identification of the servers selected as the candidates for job allocation in a storage included in the load balancer 2, associated with time data indicating a time at which operation #12 or #13 is executed. In addition, in storing the log into the storage, the load distribution system 10 may store, associated with the log, the temperature data of the servers, which have been acquired in operation #12.

The first embodiment may be altered such that the load distribution system 10 determines whether a value of temperature data acquired from each server is lower than a threshold value and selects servers having the temperature lower than the threshold value as candidates for job allocation. In the above mentioned altered embodiment, the largest number of selected candidates comes up to the total number of servers included in the system. According to the altered embodiment, such a situation may not occur that a job is allocated to a server achieving power consumption higher than a fixed value corresponding to the threshold value of the temperature, so that the power consumption may be reduced in comparison with a case in which job allocation is performed without taking the temperature into consideration.

In addition, the first embodiment may be also altered so as to stabilize job execution in place of attaining power saving such that the load distribution system 10 determines whether the temperature of each server is within a previously set appropriate range and selects a server having the temperature within the appropriate range as a candidate for job allocation.

[Second Embodiment]

Figure 5:
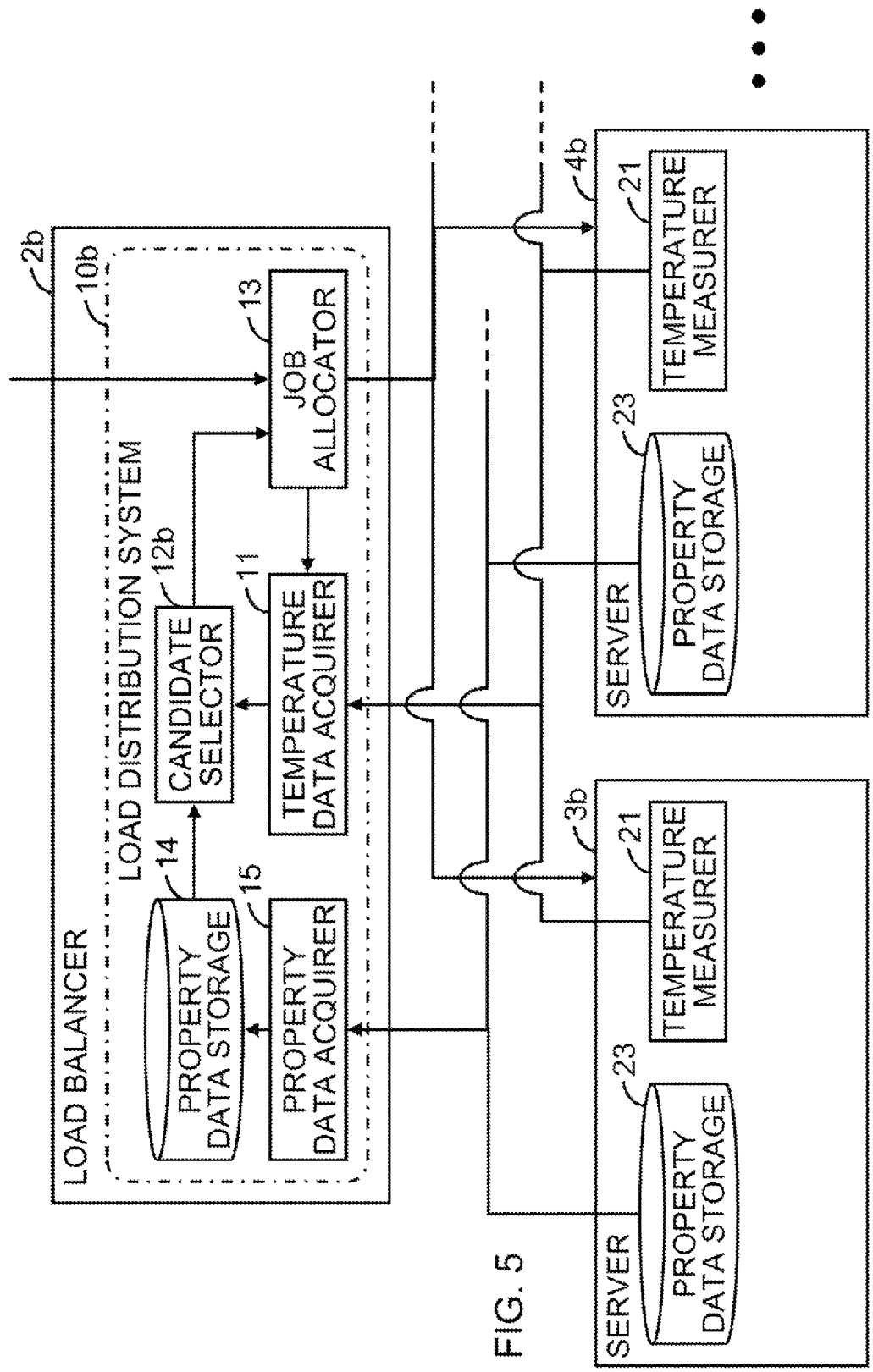
FIG. 5 is a diagram illustrating an exemplary configuration of a load balance system according to an embodiment of the present invention.

FIG. 5 illustrates an exemplary configuration of a load balance system according to a second embodiment. In the present embodiment, the same numerals as those in the first embodiment are assigned to the constitutional elements corresponding to those in the first embodiment and redundant discussion thereof will be omitted. In addition, in the discussion of the present embodiment, a constitutional element which is similar to a constitutional element in the first embodiment is designated by a numeral obtained by adding "b" to the numeral which is assigned to the corresponding constitutional element in the first embodiment.

As illustrated in FIG. 5, a load distribution system 10b is provided in a load balancer 2b according to the present embodiment by installing software. The load distribution system 10b includes the temperature data acquirer 11, a candidate selector 12b, the job allocator 13, a property data storage 14 and a property data acquirer 15. The functions of the temperature data acquirer 11 and the job allocator 13 are the same as those in the first embodiment. The functions of the candidate selector 12b, the property data storage 14 and the property data acquirer 15 are as follows.

The candidate selector 12b selects at least one of the plurality of servers 3b and 4b as a candidate for a device to which the job is to be allocated in accordance with temperature data acquired from the temperature measurer 21 included in each of the plurality of servers 3b and 4b by the temperature data acquirer 11. In the selection of the candidate, the candidate selector 12b referrers to a property table stored in advance in the property data storage 14 as operation property data of the servers included in the system. FIG. 6 illustrates an exemplary data structure of the property table. As illustrated in FIG. 6, the property table stores power consumption data of each of the servers in correspondence with each temperature at a measuring interval.

In order to allocate the job to a server achieving lower power consumption, which would be favorable from the viewpoint of power saving, the candidate selector 12b acquires the power consumption data of the respective servers 3b and 4b corresponding to the present temperatures thereof from the property table. Then, the candidate selector 12b selects, as candidates for job allocation, servers corresponding to one or more pieces of power consumption data selected from among the acquired pieces of power consumption data in order in which power consumption data having a smaller value is selected earlier than others. The number of candidates is smaller than the total number of servers included in the system and is set in accordance with an algorithm applied to the job allocator 13.

Figure 7:
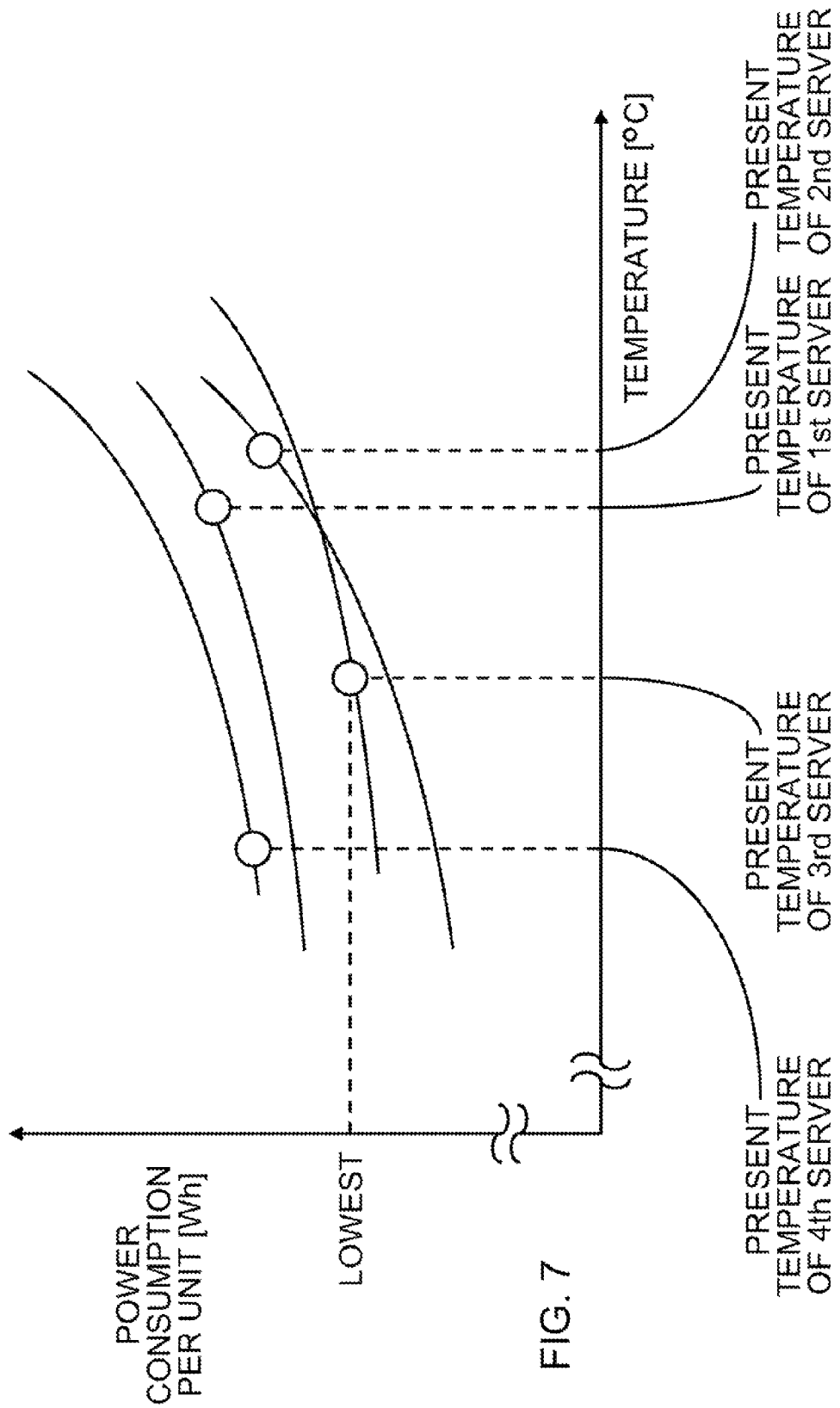
FIG. 7 is a diagram illustrating an exemplary magnitude relation among power consumption of a plurality of servers.

In the case that the number of candidates is set to "1", the candidate selector 12b selects the server achieving the lowest power consumption corresponding to the present temperature. Here, it is to be noted that it is not the case that the server having the lowest present temperature always achieves the lowest power consumption. FIG. 7 illustrates an exemplary magnitude relation among power consumption of a plurality of servers. As illustrated in FIG. 7, in the present embodiment, it is supposed that temperature-dependent properties of power consumption of the plurality of servers differ from one another. The temperature-dependent properties may differ from one another in the case that different types of servers or different types of CPUs are used. In addition, in some cases, the temperature-dependent properties may differ from one another even in the case that CPUs of the same type are used. The reason for the above may lie in the fact that a variation among the CPUs, which would occur in manufacturing, cooling power, environmental temperature and other factors influence the temperature-dependent properties of the servers. In the example illustrated in FIG. 7, although the fourth server has the lowest temperature, the third server achieves the lowest power consumption. In the case that the number of candidates is set to "1", the job is unconditionally allocated to the candidate that the candidate selector 12b has selected so as to allocate the job to the third server in the example illustrated in FIG. 7. Thus, in the above mentioned case, the candidate selector 12b functions as means for substantially determining the server to which the job is allocated.

Referring back to FIG. 5, the property data acquirer 15 collects operation property data of respective servers from property data storages 23 included in the plurality of servers 3b and 4b at a predetermined time before the load distribution is started such as, for example, when the power source of the load balancer 2b is turned on. The property data acquirer 15 stores respective pieces of operation property data in the property data storage 14 together with identification information of the servers from which the respective pieces of operation property data have been acquired, in the form of the above mentioned property table in which the power consumption data is corresponded to the temperature for each server.

Figure 8:
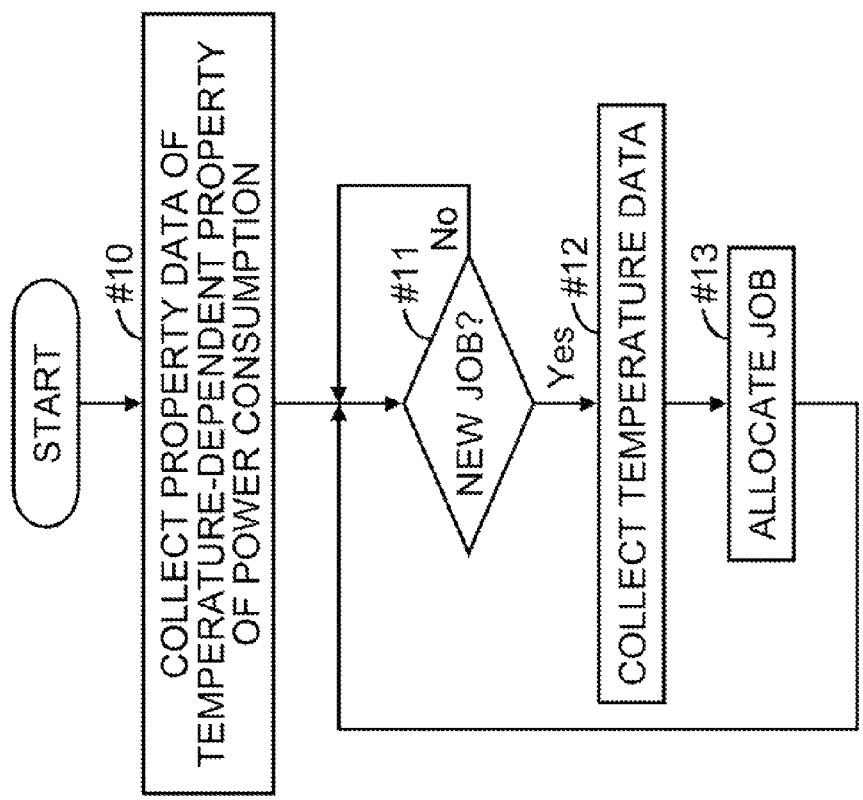
FIG. 8 is a diagram illustrating an exemplary operation flow of a load distribution system according to an embodiment of the present invention.

FIG. 8 illustrates an exemplary operation flow of the load distribution system 10b according to the present embodiment. Before starting acceptance of a job from a client, the load distribution system 10b collects temperature-dependent properties of power consumptions from respective servers and stores them in the form of the property table in the property data storage 14 (operation #10). The load distribution system 10b waits until a new job arrives at the load balancer 2b (operation #11). Upon the arrival of the new job, the load distribution system 10b collects pieces of temperature data of the respective servers to be used for determination and extracts the power consumption data corresponding to the temperature of each server from the property table stored in the property data storage 14 as the operation property data to determine servers achieving lower power consumption (operation #12). The load distribution system 10b allocates the job to, for example, the server achieving the lowest power consumption among the servers in accordance with a result of determination (operation #13). Then, the load distribution system 10b waits for arrival of the next job.

The second embodiment may be altered such that the load distribution system 10b determines whether the power consumption corresponding to the temperature of each server is lower than a threshold value and selects a server achieving power consumption lower than the threshold value as candidates for job allocation. In the above mentioned altered embodiment, the largest number of selected candidates comes up to the total number of servers included in the system. According to the altered embodiment, such a situation may not occur that a job is allocated to a server achieving power consumption higher than the threshold value, so that the power consumption may be reduced in comparison with a case in which job allocation is performed without taking the power consumption into consideration.

In addition, in the case that the number and the type of servers included in the system are not frequently changed, the second embodiment may be favorably altered such that the property data storage 14 of the load distribution system 10b stores the operation property data of the servers 3b and 4b in advance. According to the above mentioned altered embodiment, the property data acquirer 15 of the load distribution system 10b and the property data storages 23 included in the respective servers 3b and 4b may be omitted.

According to the second embodiment, the load distribution system 10b is allowed to allocate the job to the server achieving the lowest power consumption with reference to the operation properties of the respective servers and hence power saving of the server system may be more favorably promoted regardless of a difference in operation property between the servers 3b and 4b.

[Third Embodiment]

Figure 9:
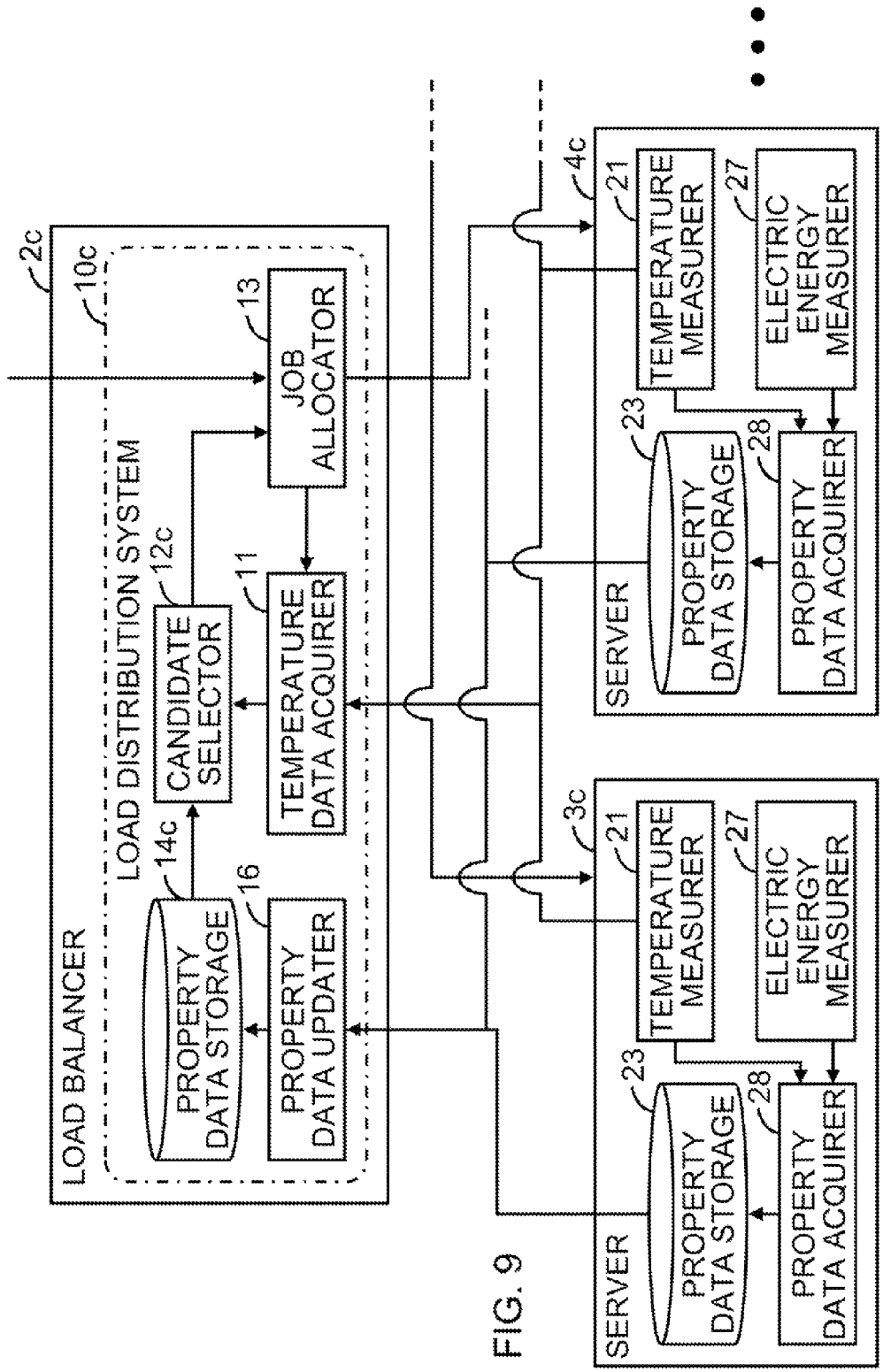
FIG. 9 is a diagram illustrating an exemplary configuration of a load balance system according to an embodiment of the present invention.

FIG. 9 illustrates an exemplary configuration of a load distribution system according to a third embodiment. In the present embodiment, the same numerals as those in the first and second embodiments are assigned to the constitutional elements corresponding to those in the first and second embodiments and redundant discussion thereof will be omitted. In addition, in the discussion of the present embodiment, a constitutional element which is similar to a constitutional element in the first and second embodiments is designated by a numeral obtained by adding "c" to the numeral which is assigned to the corresponding constitutional element in the first and second embodiments.

As illustrated in FIG. 9, a load distribution system 10c is provided in a load balancer 2c according to the present embodiment by installing software. The load distribution system 10c includes the temperature data acquirer 11, a candidate selector 12c, the job allocator 13, a property data storage 14c and a property data updater 16. The functions of the temperature data acquirer 11 and the job allocator 13 are the same as those in the first embodiment. The functions of the candidate selector 12c and the property data storage 14c are the same as those of the candidate selector 12b and the property data storage 14 in the second embodiment. The functions of the property data updater 16 are as follows.

The property data updater 16 collects operation property data of the plurality of servers 3c and 4c from the property data storages 23 included therein at an appropriate time. The property data updater 16 updates the property table in which the power consumption data is corresponded to the temperature for each server, by storing the respective collected pieces of operation property data in the property data storage 14c together with identification information of the servers from which the respective pieces of operation property data have been acquired, in the form of the property table.

Pieces of operation property data to be collected by the property data updater 16 are generated in the servers 3c and 4c by measuring the temperatures and the electric energy of the servers 3c and 4c. As elements for generation of the operation property data, each of the servers 3c and 4c includes a temperature measurer 21, an electric energy measurer 27 and a property data acquirer 28. The property data acquirer 28 acquires measured values of the temperature and the electric energy respectively from the temperature measurer 21 and the electric energy measurer 27 and stores the measured values of the electric energy as power consumption data in the property data storage 23, associated with each of a plurality of pieces of temperature data indicating, for example, temperatures at an interval of one degree centigrade.

Figure 10:
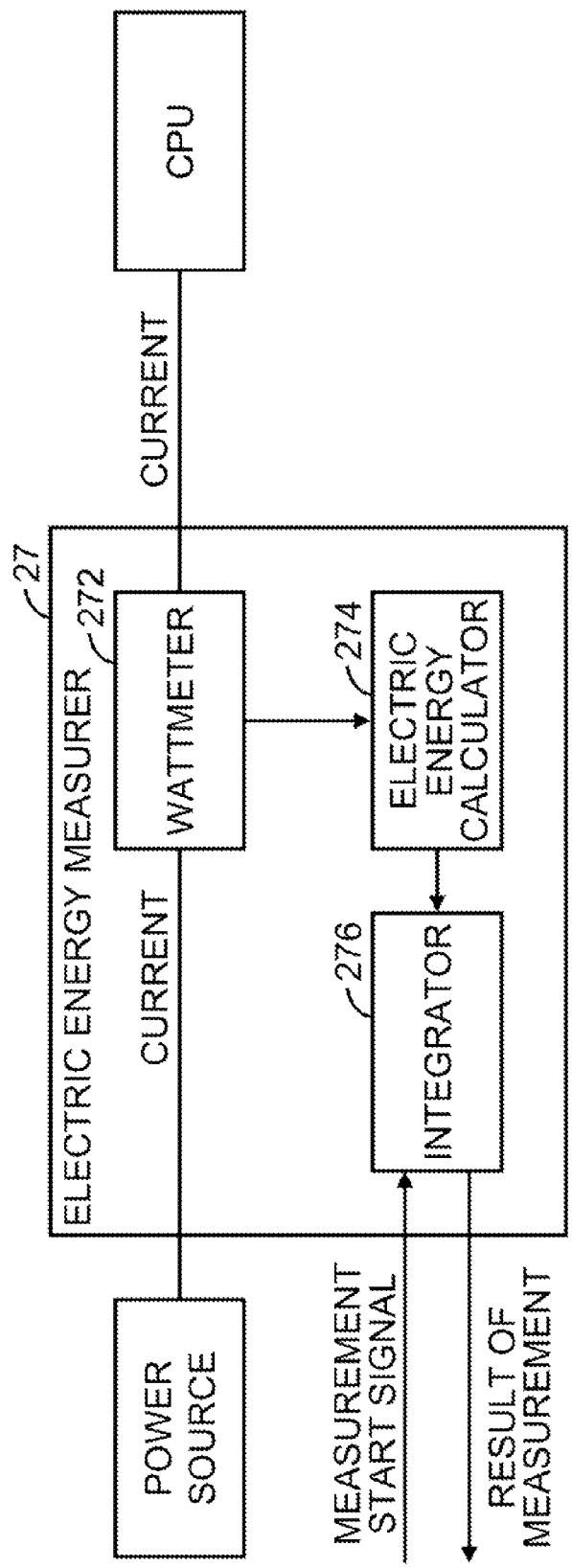
FIG. 10 is a diagram illustrating an exemplary configuration of an electric energy measurer according to an embodiment of the present invention.

FIG. 10 illustrates an exemplary configuration of the electric energy measurer 27. As illustrated in FIG. 10, the electric energy measurer 27 includes a wattmeter 272, an electric energy calculator 274 and an integrator 276. The wattmeter 272 measures the electric power which is supplied from a power source to a CPU. Specifically, the wattmeter 272 measures voltage between both terminals of a small resistance which is inserted into a current path connected to the CPU, calculates current data by dividing the voltage data by a value of the small resistance, and obtains electric power data by multiplying the calculated current data by a value of the source voltage. The electric energy calculator 274 calculates electric energy data by multiplying the electric power data by a sampling interval which is a unit time such as millisecond, second or minute. The integrator 276 receives a measurement start signal from the property data acquirer 28 to start integration of the electric power and sends a result of the measurement to the property data acquirer 28.

Figure 11:
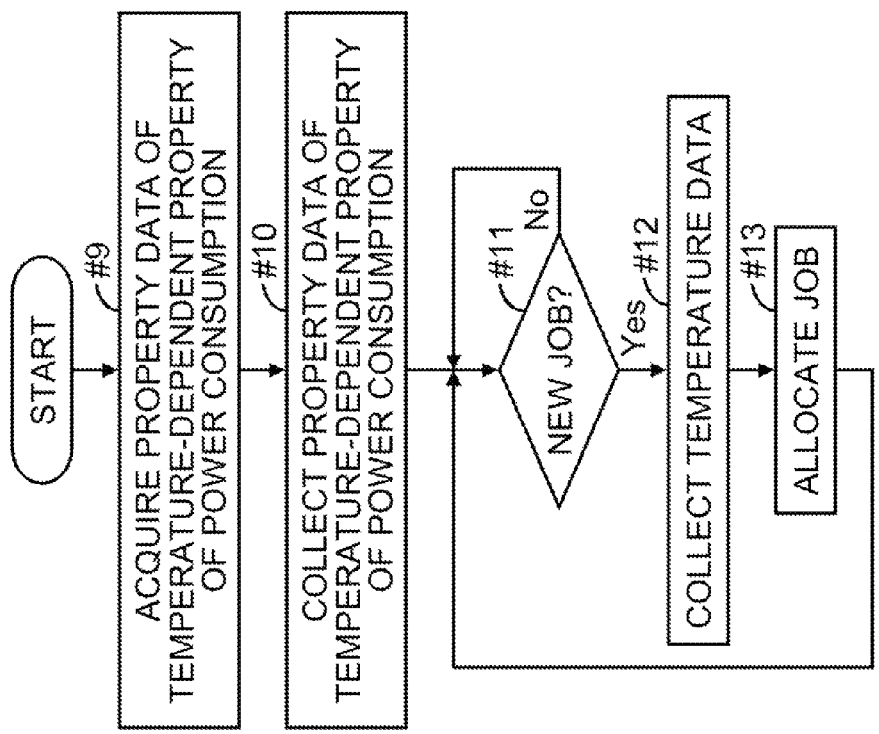
FIG. 11 is a diagram illustrating an exemplary operation flow of a load distribution system and servers according to an embodiment of the present invention.

FIG. 11 illustrates an exemplary operation flow of the load distribution system 10c and the servers 3c and 4c according to the present embodiment. Each of the servers 3c and 4c acquires property data of the temperature-dependent property of the power consumption of the CPU included therein and stores the acquired property data in the property data storage 23 as will be discussed later (operation #9). As in the case in the second embodiment, before starting acceptance of a job from a client, the load distribution system 10c collects the temperature-dependent properties of power consumptions from the respective servers and stores them in the form of the property table in the property data storage 14c (operation #10). The load distribution system 10c waits until a new job arrives at the load balancer 2c (operation #11). Upon the arrival of the new job, the load distribution system 10c collects pieces of temperature data of the respective servers to be used for determination and extracts the power consumption data corresponding to the temperature of each server from the property table stored in the property data storage 14c as the operation property data to determine servers achieving lower power consumption (operation #12). The load distribution system 10c allocates the job to, for example, the server achieving the lowest power consumption among the servers in accordance with a result of the determination (operation #13). Then, the load distribution system 10c waits for arrival of the next job.

Figure 12:
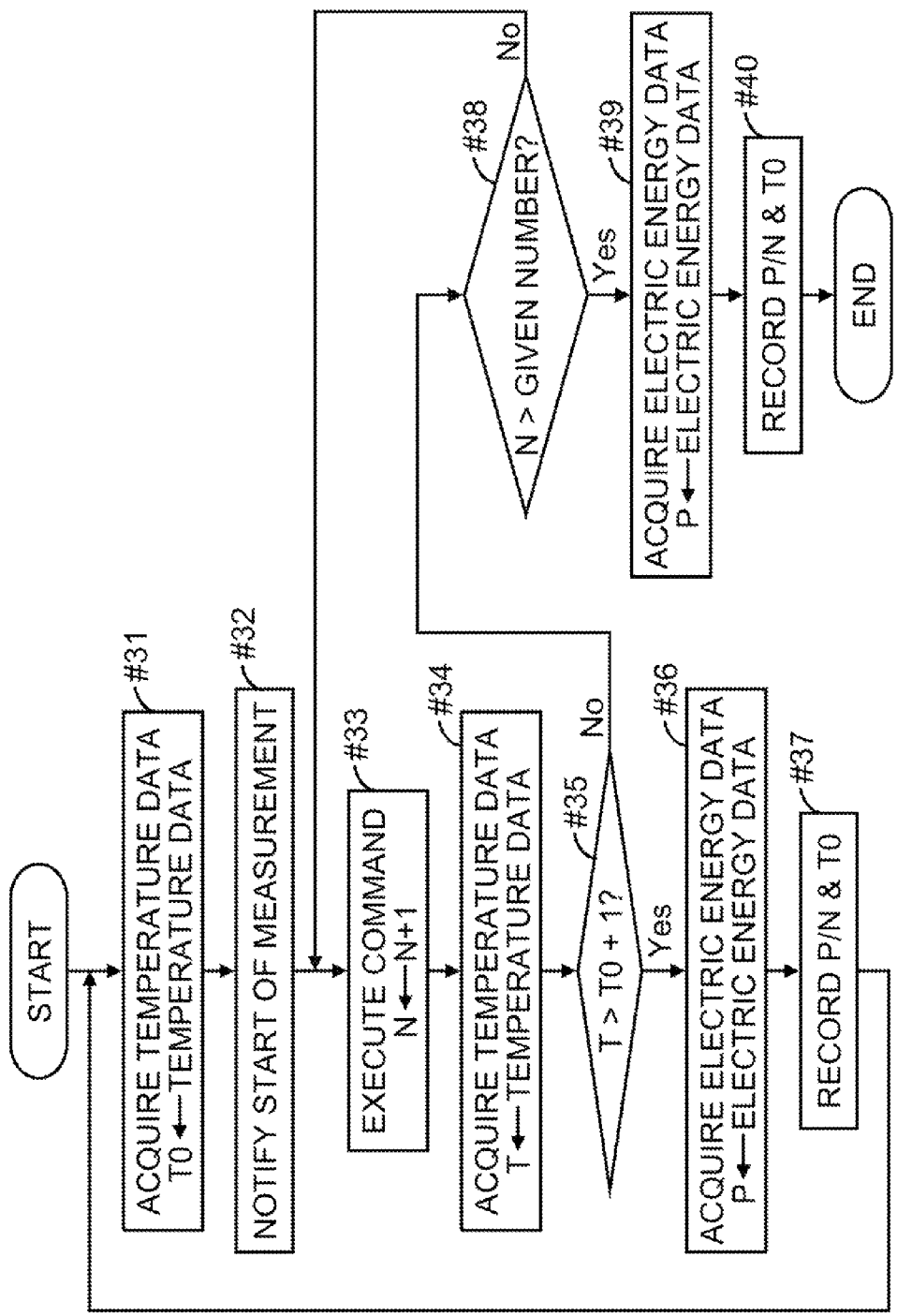
FIG. 12 is a diagram illustrating an exemplary operation flow of a property data acquiring process executed by a server according to an embodiment of the present invention.

FIG. 12 illustrates a first exemplary operation flow of a property data acquiring process executed by each of the servers 3c and 4c. In the present example, the power consumption per command is measured. In each of the servers 3c and 4c, the property data acquirer 28 acquires temperature data from the temperature measurer 21 and stores the acquired temperature data as a start temperature T0 (operation #31), and notifies the electric energy measurer 27 of start of the measurement (operation #32). The property data acquirer 28 makes the CPU execute a predetermined command, e.g., an application programming interface (API) command, and increments a command execution number (the number of times that command execution is performed) N by one (operation #33). The property data acquirer 28 again acquires the temperature data from the temperature measurer 21 to store the acquired temperature data as the latest temperature T (operation #34). The property data acquirer 28 checks to see whether the latest temperature T is higher than the start temperature T0 by one or more degrees centigrade (operation #35). When a temperature change of one or more degrees centigrade is not found ("No" in operation #35), the property data acquirer 28 advances the process to operation #38. The property data acquirer 28 checks to see whether command execution is repeated more than a given number of times, e.g., 1000 times (operation #38). The temperature of the CPU increases to some extent and thereafter enters a saturated state in which the temperature hardly increases.

The check is performed in order to abort the measurement when the temperature has entered the saturated state. When the command execution number N is smaller than or equal to the given number ("No" in operation #38), the property data acquirer 28 returns the process to operation #33 to make the CPU execute the command.

When the temperature change of one or more degrees centigrade has occurred owing to execution of the command ("Yes" in operation #35), the property data acquirer 28 acquires the electric energy data from the electric energy measurer 27 (operation #36). Then, the property data acquirer 28 divides the acquired electric energy data by the presently counted command execution number N to calculate the electric energy per command and records the calculated data of electric energy per command associated with the start temperature T0 (operation #37). Then, the property data acquirer 28 acquires the power consumption per command that substantially corresponds to each of a plurality of temperatures at an interval of one degree centigrade by repeating operations #31 to #38.

When the command execution number N is larger than the given number ("Yes" in operation #38), the property data acquirer 28 regards that the temperature is now in the saturated state, acquires the electric energy data from the electric energy measurer 27 (operation #39). The property data acquirer 28 calculates and records the electric energy per command (operation #40). Then, the property data acquirer 28 terminates the process.

Figure 13:
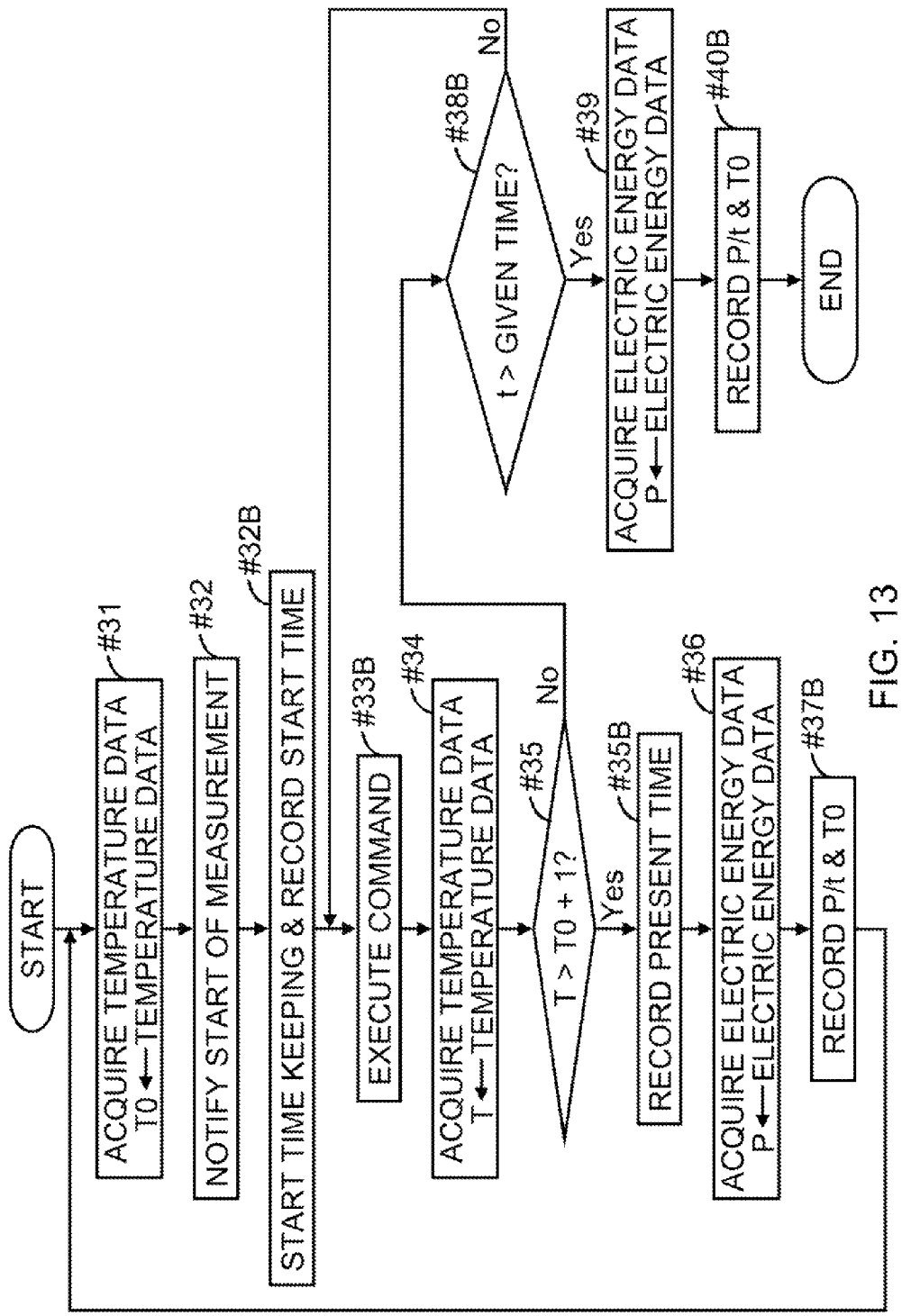
FIG. 13 is a diagram illustrating an exemplary operation flow of a property data acquiring process executed by a server according to an embodiment of the present invention.

FIG. 13 illustrates a second exemplary operation flow of the property data acquiring process executed by each of the servers 3c and 4c. In the present example, the power consumption per unit time is measured. The outline of the operation flow is the same as that in the first example.

In each of the servers 3c and 4c, the property data acquirer 28 stores the start temperature T0 (operation #31), notifies the electric energy measurer 27 of start of measurement (operation #32), and starts time keeping and records a start time (operation #32B). The property data acquirer 28 makes the CPU execute a predetermined command (operation #33B). The property data acquirer 28 again acquires the temperature data from the temperature measurer 21 to store the acquired temperature data as the latest temperature T (operation #34). The property data acquirer 28 checks to see whether the latest temperature T is higher than the start temperature T0 by one or more degrees centigrade (operation #35). When a temperature change of one or more degrees centigrade is not found ("No" in operation #35), the property data acquirer 28 advances the process to operation #38B. The property data acquirer 28 checks to see whether a time elapsed after the time keeping has been started is longer than a given time (for example, one minute). The check is performed in order to abort the measurement when the temperature has entered the saturated state. When the given time does not yet elapse ("No" in operation #38B), the property data acquirer 28 returns the process to operation #33B to make the CPU execute the command.

When the temperature change of one or more degrees centigrade has occurred owing to execution of the command ("Yes" in operation #35), the property data acquirer 28 records the present time (operation #35B) and acquires the electric energy data from the electric energy measurer 27 (operation #36). Then, the property data acquirer 28 divides the acquired electric energy data by an elapsed time "t" which has elapsed up to that time to calculate the electric energy per unit time and records the calculated data of the electric energy per unit time associated with the start temperature T0 (operation #37B). Then, the property data acquirer 28 acquires the power consumption per unit time which substantially corresponds to each of a plurality of temperatures at an interval of one degree centigrade by repeating operations #31 to #38.

When the given time has elapsed ("Yes" in operation #38B), the property data acquirer 28 regards that the temperature is now in the saturated state, acquires the electric energy data from the electric energy measurer 27 (operation #39). The property data acquirer 28 calculates and records the electric energy per unit time (operation #40B). Then, the property data acquirer 28 terminates the process.

The third embodiment may be altered such that as in the case in the altered embodiment of the second embodiment, the load distribution system 10c determines whether the power consumption corresponding to the temperature of each server is lower than a threshold value and selects a server achieving power consumption lower than the threshold value as candidates for job allocation. In the above mentioned altered embodiment, the largest number of selected candidates comes up to the total number of servers included in the system. According to the above mentioned altered embodiment, such a situation may not occur that a job is allocated to a server achieving power consumption higher than the threshold value, so that the power consumption may be reduced in comparison with a case in which job allocation is performed without taking the power consumption into consideration.

According to the third embodiment, even when the operation properties of the servers 3c and 4c are changed with time or with change of the environment, the load distribution system 10c is allowed to allocate the job to the server achieving the lowest power consumption with reference to the changed operation properties.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been discussed in detail, it should be understood that the various changes, substitutions, and alterations could be made hereto without departing from the spirit and scope of the invention.

What is claimed is:

1. A device for allocating a job, the device comprising:
   a memory, and
   circuitry coupled to the memory and configured to:
   acquire temperature data indicating temperature of each of a plurality of arithmetic devices;
   set a number of candidates to which the job is to be allocated;
   select, by a load distribution system, at least one of the plurality of arithmetic devices as a candidate based on a power consumption corresponding to the acquired temperature data, a number of the at least one of the plurality of arithmetic devices selected being equal to the set number of candidates;
   allocate the job to the selected arithmetic device when the set number of candidates is one; and
   allocate the job to one of the selected arithmetic devices in accordance with a predetermined algorithm when the set number of candidates is equal to or more than two.

2. The device according to claim 1, further comprising:
   a storage configured to store operation property data of each of the plurality of arithmetic devices, the operation property data indicating a relation between temperature and power consumption,
   wherein the circuitry is further configured to:
   acquire power consumption data corresponding to the temperature data of each of the plurality of arithmetic devices based on the operation property data, and
   select the arithmetic devices in order in which a device achieving lower power consumption is selected earlier.

3. The device according to claim 2, wherein the circuitry is further configured to:
   acquire measured data of temperature-dependent property of power consumption of each of the plurality of arithmetic devices, and
   store the measured data as the operation property data in the storage.

4. The device according to claim 1, wherein the circuitry is further configured to determine whether a value of the temperature data is lower than a threshold value and select the arithmetic devices having the temperature lower than the threshold value.

5. The device according to claim 1, wherein the circuitry is further configured to determine whether a value of the temperature data is within a predetermined range and select the arithmetic devices having the temperature within the predetermined range.

6. A load distribution method executed by a load distribution system for allocating a job to one of a plurality of arithmetic devices, the load distribution method comprising:
   acquiring temperature data indicating temperature of each of the plurality of arithmetic devices;
   setting a number of candidates to which the job is to be allocated;
   selecting, by the load distribution system, at least one of the plurality of arithmetic devices as a candidate based on a power consumption corresponding to the acquired temperature data, a number of the at least one of the plurality of arithmetic devices selected being equal to the set number of candidates;
   allocating the job to the selected arithmetic device when the set number of candidates is one; and
   allocating the job to one of the selected arithmetic devices in accordance with a predetermined algorithm when the set number of candidates is equal to or more than two.

7. The load distribution method according to claim 6, wherein
   the load distribution system includes a storage configured to store operation property data of each of the plurality of arithmetic devices, the operation property data indicating a relation between temperature and power consumption,
   the acquiring includes acquiring power consumption data corresponding to the temperature data of each of the plurality of arithmetic devices based on the operation property data, and
   the selecting includes selecting the arithmetic devices in order in which a device achieving lower power consumption is selected earlier.

8. The load distribution method according to claim 7, wherein
   the acquiring includes acquiring measured data of temperature-dependent property of power consumption of each of the plurality of arithmetic devices, and
   the storing includes storing the measured data as the operation property data in the storage.

9. The load distribution method according to claim 6, further comprising:
   determining whether a value of the temperature data is lower than a threshold value, and
   the selecting includes selecting the arithmetic devices having the temperature lower than the threshold value.

10. The load distribution method according to claim 6, further comprising:
    determining whether a value of the temperature data is within a predetermined range, and
    the selecting includes selecting the arithmetic devices having the temperature within the predetermined range.

11. The load distribution method according to claim 6, wherein
    the acquiring includes causing the plurality of arithmetic devices to measure the temperature data by using a temperature sensor built in a circuitry included in each of the plurality of arithmetic devices.

12. The load distribution method according to claim 11, wherein
    the acquiring includes causing the plurality of arithmetic devices to install a program to acquire the temperature data and to measure the temperature data using the temperature sensor by executing the program.

13. A computer-readable, non-transitory medium storing a program causing a computer for allocating a job to one of a plurality of arithmetic devices to execute a procedure, the procedure comprising:
    acquiring temperature data indicating temperature of each of the plurality of arithmetic devices;

setting a number of candidates to which the job is to be allocated;

selecting, by a load distribution system, at least one of the plurality of arithmetic devices as a candidate based on a power consumption corresponding to the acquired temperature data, a number of the at least one of the plurality of arithmetic devices selected being equal to the set number of candidates;

allocating the job to the selected arithmetic device when the set number of candidates is one; and allocating the job to one of the selected arithmetic devices in accordance with a predetermined algorithm when the set number of candidates is equal to or more than two.

\* \* \* \* \*